J. HERMAN.
CULTIVATOR OR HARROW.
APPLICATION FILED MAR. 28, 1911.
1,068,901.
Patented July 29, 1913.
3 SHEETS—SHEET 3.
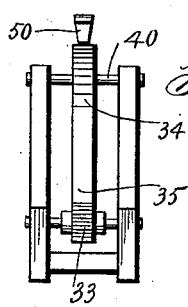
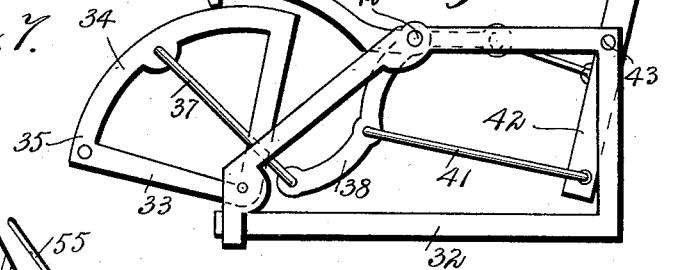
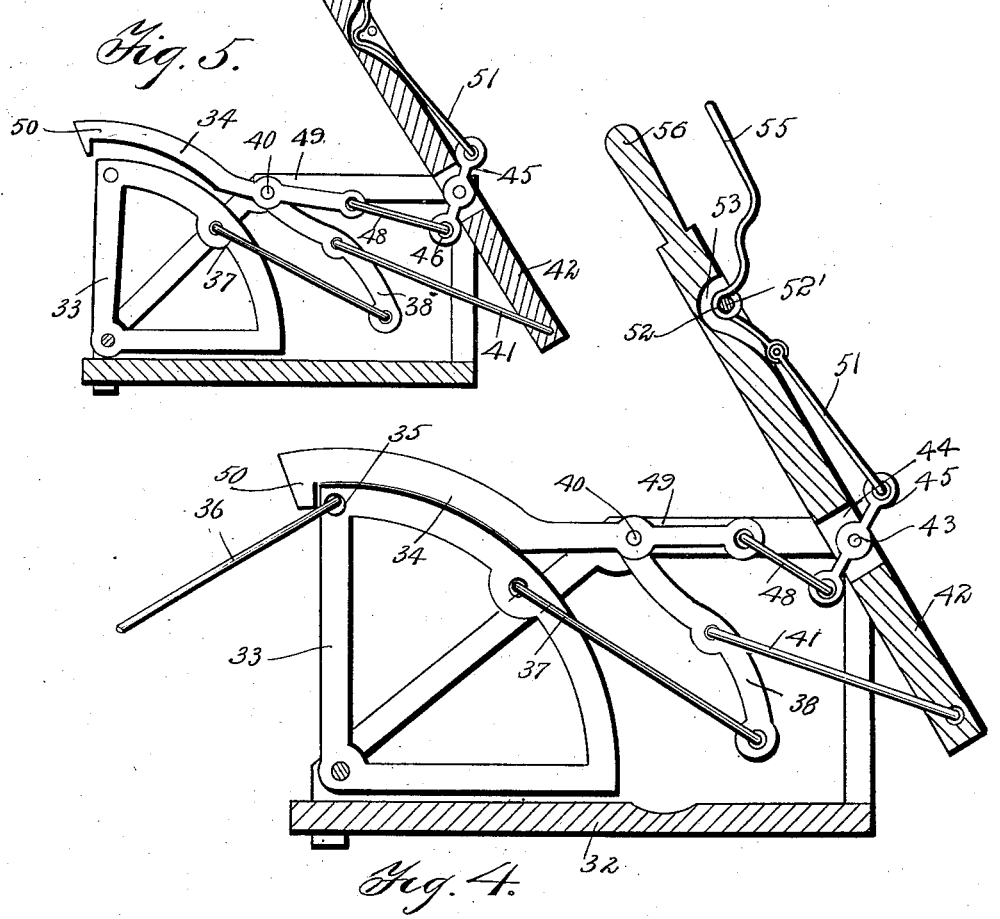
Witnesses
M. P. McKee.
L. M. Gillespie.
Inventor
Jacob Herman
By Alex. J. Wedderburn, Jr.
Attorney

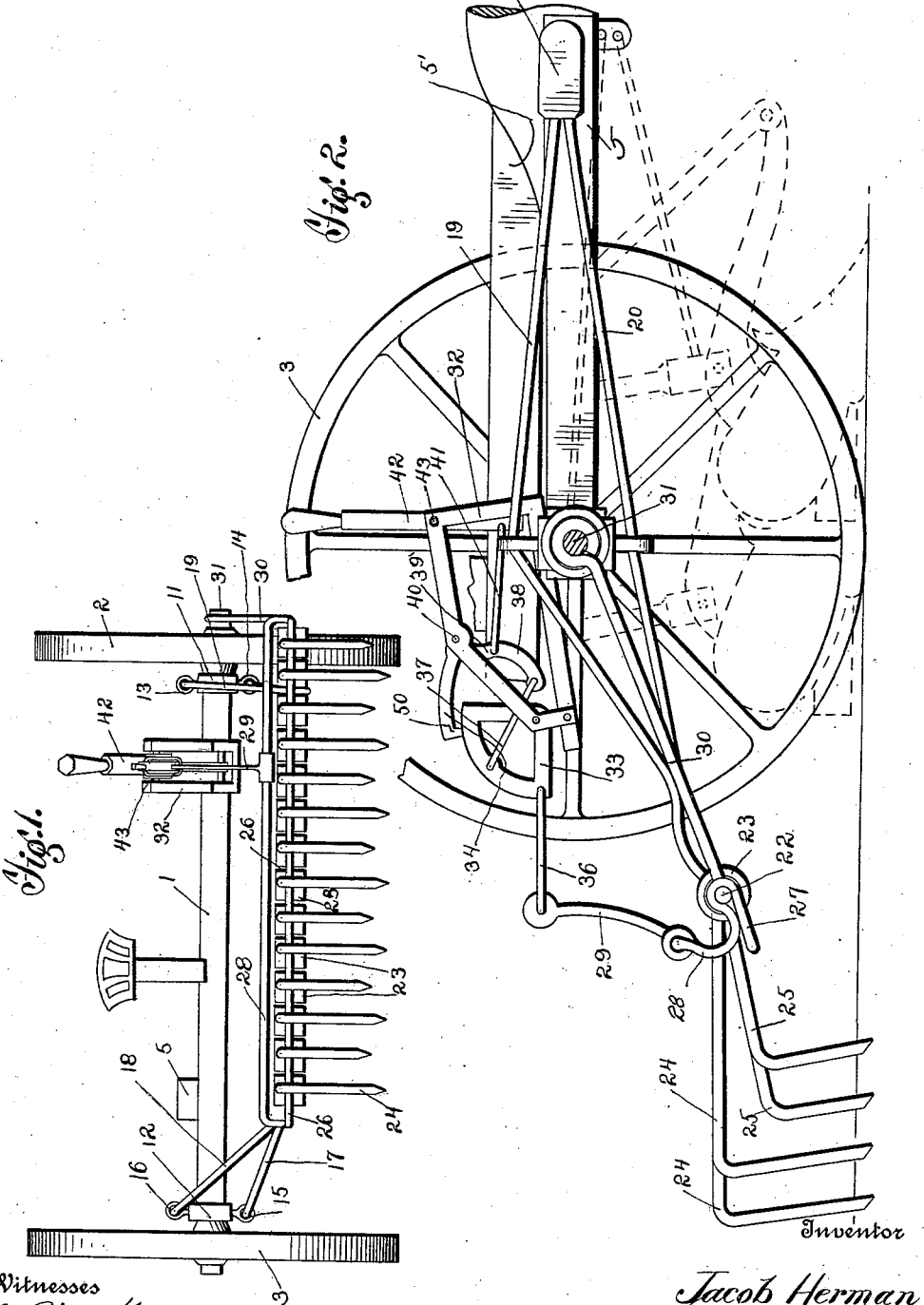

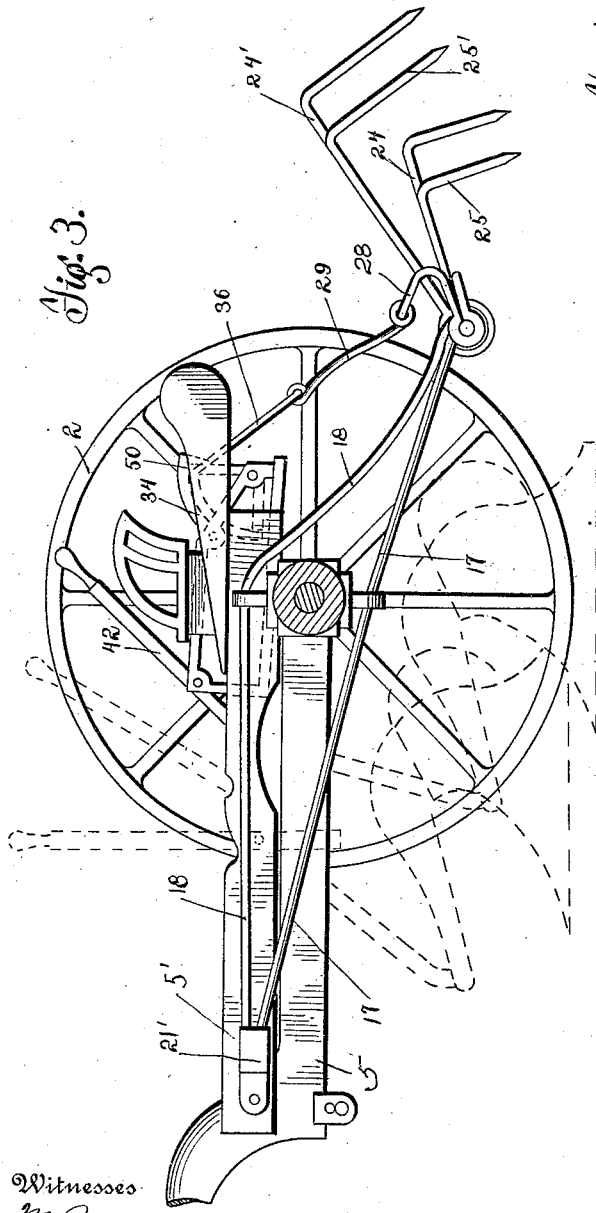

UNITED STATES PATENT OFFICE.

JACOB HERMAN, OF BRADDOCK, PENNSYLVANIA.

CULTIVATOR OR HARROW.

1,068,901.     Specification of Letters Patent.     Patented July 29, 1913.

Application filed March 28, 1911. Serial No. 617,339.

*To all whom it may concern:*

Be it known that I, JACOB HERMAN, a citizen of the United States, residing at Braddock, in the county of Allegheny and State of Pennsylvania, have invented certain new and useful Improvements in Cultivators or Harrows, of which the following is a specification.

This invention relates to improvements in cultivators or harrows, and the main object of the invention is to provide a harrow that may be used in connection with a sulky plow.

With the above and other objects in view, I have invented the harrow illustrated in the accompanying drawings in which—

Figure 1 is a rear view of my improved harrow attached to a sulky. Fig. 2 is an elevational view of my device shown partially in section and partially broken away, Fig. 3 is a view similar to Fig. 2, of the opposing side of the device, Fig. 3ª is a perspective detailed view of a harrow. Fig. 4 is an enlarged detail of the harrow-operating device. Fig. 5 is a view similar to Fig. 4 showing the clutch member raised. Fig. 6 is a view similar to Fig. 5 showing the harrow-operating member in the position it attains when the harrow is lowered, and Fig. 7 is a rear detail view of the harrow-operating member.

Like reference characters indicate like parts throughout the specification and in the various views in the drawings, in which—

1 indicates an axle upon which are mounted wheels 2 and 3. Mounted upon the axle adjacent the wheels 2 and 3, are bars 11 and 12 having eyes 13, 14, 15, and 16, through which bars 17, 18, 19 and 20 pass. The forward end of these bars are secured to the members 21 and 21' on the forward ends of the beams 5 and 5', the beam 5' being fixed onto the upper surface of the axle 1, and the beam 5 being fixed on a plane therewith. The rear portion of these bars support the rod 22, upon which are loosely mounted rotatable members 23, each of which carry a long harrow tooth 24 and a short harrow tooth 25, both of which have their ends bent at right angles, the teeth 25 being on a parallel line directly beneath the teeth 24. Every alternate member 23 carries teeth 24' and 25' which are longer than teeth 24 and 25, making a staggered arrangement of these harrow teeth. The members 23 are cylindrical in shape and are pivotally mounted on the rod 22 and have secured to each one thereof a pair of teeth, one tooth being shorter than the other, the short teeth 25 and 25' being directly below the long teeth 24 and 24'. The members 23 are independent of one another allowing the teeth on one member to rise independent of the other members.

Mounted upon the projecting ends of the rod 22 is a member 26 part of which runs directly beneath all of the teeth at a point very close to the rod 22. The ends 27 of this member pass under the rod 22 and bend there-around and is then doubled upon itself as at 28, and then runs entirely across and above the harrow teeth. Upon the upper portion of this member 28 is pivotally mounted an arm 29. Also fixedly on one end of the rod 22 is one end of a brace 30, the other end of which is mounted upon the extended portion 31 of the axle 1.

Mounted upon the axle 1 is a frame work 32, upon which is pivotally mounted the mechanism for raising and lowering the harrow teeth.

The mechanism for raising and lowering the harrow teeth may be of any suitable construction, and, as shown, the sector member 33 is pivoted to the frame 32 and is connected by a link 37 to one end of a pivotal arm 38, pivoted at 40 on the frame 32 and connected to said arm and to one end of an operating lever 42 pivoted at 43 is a link rod 41. By means of lever 42 the sector member 33 may be actuated so as to rock forwardly or rearwardly to cause member 29 to lower or lift the harrow teeth. Before lever 42 is manipulated, however, it will be necessary to release the catch 50 formed on lever 34 fulcrumed at 40 and connected by link 48 to a double arm crank 45, which crank is pivoted in a slot 44 of lever 42 operated by means of the rod 51, which is linked at one end to crank 45, and is formed with a part 52 engageable with the pin 52' carried by lever 42, said part 52 resting on said pin to prevent crank 45 moving downwardly. A handle 55 is formed upon the rod 42, and this handle will be manipulated so as to draw the crank up, as shown in Fig. 5, whereby the inner end of lever 34 will be drawn down and the catch 50 drawn up and out of engagement with the sector member 33. It will thus be seen that the rod 51 and the lever 42 will not be actuated simultaneously. When it is desired to raise the harrow teeth from contact with the ground the lever handle 56 is thrown rearwardly causing the link 41 to bring the lower end of the link 38 forwardly which draws the link 37 forward which in turn swings the bell crank 33 forwardly which draws the link 36 and arm 29 upwardly thus raising the member 26 and consequently all of the harrow teeth. In order to again lower the teeth to operative position the hook 50 is released from the crank 33 by the operation of the member 55 whereupon the weight of the teeth will cause them to drop.

Numerous modifications may be resorted to in practice without departing in essence from the details of construction herein disclosed.

I claim—

1. A harrow mounted upon a sulky, said harrow consisting of a bar, a series of independently movable pivotally mounted rings thereon, a pair of teeth having vertically alined arms carried by each of said rings.

2. A harrow mounted upon a sulky, said harrow consisting of a bar, a series of independently movable pivotally mounted rings thereon, a pair of teeth having vertically alined arms carried by each of said rings, said teeth being of different lengths.

3. A harrow mounted upon a sulky, said harrow consisting of a bar, a series of independently movable pivotally mounted rings thereon, a pair of teeth having vertically alined arms carried by each of said rings, said teeth being of different lengths, the teeth of each ring being of different lengths from the teeth of its adjacent rings.

4. A harrow mounted upon a sulky, said harrow consisting of a bar, a series of independently movable pivotally mounted rings thereon, a pair of teeth having vertically alined arms carried by each of said rings, said teeth being of different lengths, the teeth of each ring being of different lengths from the teeth of its adjacent rings, a rod bent to pass entirely around all of said teeth whereby they may be simultaneously operated.

5. A harrow mounted upon a sulky, said harrow consisting of a bar, a series of independently movable pivotally mounted rings thereon, a pair of teeth having vertically alined arms carried by each of said rings, said teeth being of different lengths, the teeth of each ring being of different lengths from the teeth of its adjacent rings, a rod bent to pass entirely around all of said teeth whereby they may be simultaneously operated, said rod being pivotally mounted on said bar.

6. A harrow mounted upon a sulky, said harrow consisting of a bar, a series of independently movable pivotally mounted rings thereon, a pair of teeth having vertically alined arms carried by each of said rings, said teeth being of different lengths, the teeth of each ring being of different lengths from the teeth of its adjacent rings, a rod bent to pass entirely around all of said teeth whereby they may be simultaneously operated, said rod being pivotally mounted on said bar, an arm secured to said rod and a bell crank to which said arm is connected whereby said teeth may be raised and lowered.

7. A harrow mounted upon a sulky, said harrow consisting of a bar, a series of independently movable pivotally mounted rings thereon, a pair of teeth having vertically alined arms carried by each of said rings, said teeth being of different lengths, the teeth of each ring being of different lengths from the teeth of its adjacent rings, a rod bent to pass entirely around all of said teeth whereby they may be simultaneously operated, said rod being pivotally mounted on said bar, an arm secured to said rod and a bell crank to which said arm is connected whereby said teeth may be raised and lowered, means for raising the end of said crank to which said arm is connected and a loosely pivoted hook adapted to engage and hold said end in a raised position.

8. A harrow mounted upon a sulky, said harrow consisting of a bar, a series of independently movable pivotally mounted rings thereon, a pair of teeth having vertically alined arms carried by each of said rings, said teeth being of different lengths, the teeth of each ring being of different lengths from the teeth of its adjacent rings, a rod bent to pass entirely around all of said teeth whereby they may be simultaneously operated, said rod being pivotally mounted on said bar, an arm secured to said rod and a bell crank to which said arm is connected whereby said teeth may be raised and lowered, means for raising the end of said crank to which said arm is connected, a loosely pivoted hook adapted to engage and hold said end in a raised position, and means for releasing said hook.

In testimony whereof I affix my signature in presence of two witnesses.

JACOB HERMAN.

Witnesses:
EDMUND D. NUGENT,
HENRY WELLS.

Copies of this patent may be obtained for five cents each, by addressing the "Commissioner of Patents. Washington, D. C."